United States Patent
Muskos

(10) Patent No.: US 7,413,226 B2
(45) Date of Patent: Aug. 19, 2008

(54) BUMPER BEAM ARRANGEMENT

(75) Inventor: Per Muskos, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 22 days.

(21) Appl. No.: 10/591,022

(22) PCT Filed: Mar. 18, 2005

(86) PCT No.: PCT/SE2005/000397

§ 371 (c)(1),
(2), (4) Date: Aug. 29, 2006

(87) PCT Pub. No.: WO2005/090128

PCT Pub. Date: Sep. 29, 2005

(65) Prior Publication Data

US 2007/0182176 A1    Aug. 9, 2007

(30) Foreign Application Priority Data

Mar. 23, 2004   (SE) .................................... 0400728

(51) Int. Cl.
   *B60R 19/34* (2006.01)
(52) U.S. Cl. .................................................... 293/133
(58) Field of Classification Search ................ 293/133,
   293/155, 120, 102, 132, 121
   See application file for complete search history.

(56) References Cited

U.S. PATENT DOCUMENTS

| 4,190,276 | A  | * | 2/1980  | Hirano et al. ............... 293/133 |
| 5,785,367 | A  | * | 7/1998  | Baumann et al. ............ 293/133 |
| 5,803,514 | A  | * | 9/1998  | Shibuya et al. .............. 293/133 |
| 5,853,195 | A  | * | 12/1998 | Le et al. ................. 296/187.09 |
| 5,876,077 | A  | * | 3/1999  | Miskech et al. ............. 293/132 |
| 6,174,009 | B1 | * | 1/2001  | McKeon .................... 293/133 |
| 6,354,641 | B1 | * | 3/2002  | Schroeder et al. ........... 293/155 |
| 6,929,297 | B2 | * | 8/2005  | Muller et al. ............... 293/133 |
| 7,093,866 | B2 | * | 8/2006  | Toneatti et al. ............. 293/133 |
| 7,131,674 | B2 | * | 11/2006 | Evans et al. ................ 293/120 |
| 7,163,243 | B2 | * | 1/2007  | Evans ........................ 293/121 |
| 2003/0141728 | A1 | * | 7/2003 | Arvelo et al. ............... 293/133 |
| 2004/0011582 | A1 | * | 1/2004 | Aoki ......................... 180/274 |

FOREIGN PATENT DOCUMENTS

| DE | 19635285 | 3/1997 |
| EP | 1464546  | 10/2004 |

* cited by examiner

*Primary Examiner*—Kiran B. Patel
(74) *Attorney, Agent, or Firm*—Mark P. Stone

(57) ABSTRACT

A bumper beam arrangement comprises a bumper beam fastened in two crash boxes (12,13). The crash boxes are vertically higher than the bumper beam, and the bumper beam is fastened vertically off set in the crash boxes. The portions of the crash boxes that are not covered by the bumper beam extend forwards to the front end of the bumper beam profile.

3 Claims, 4 Drawing Sheets

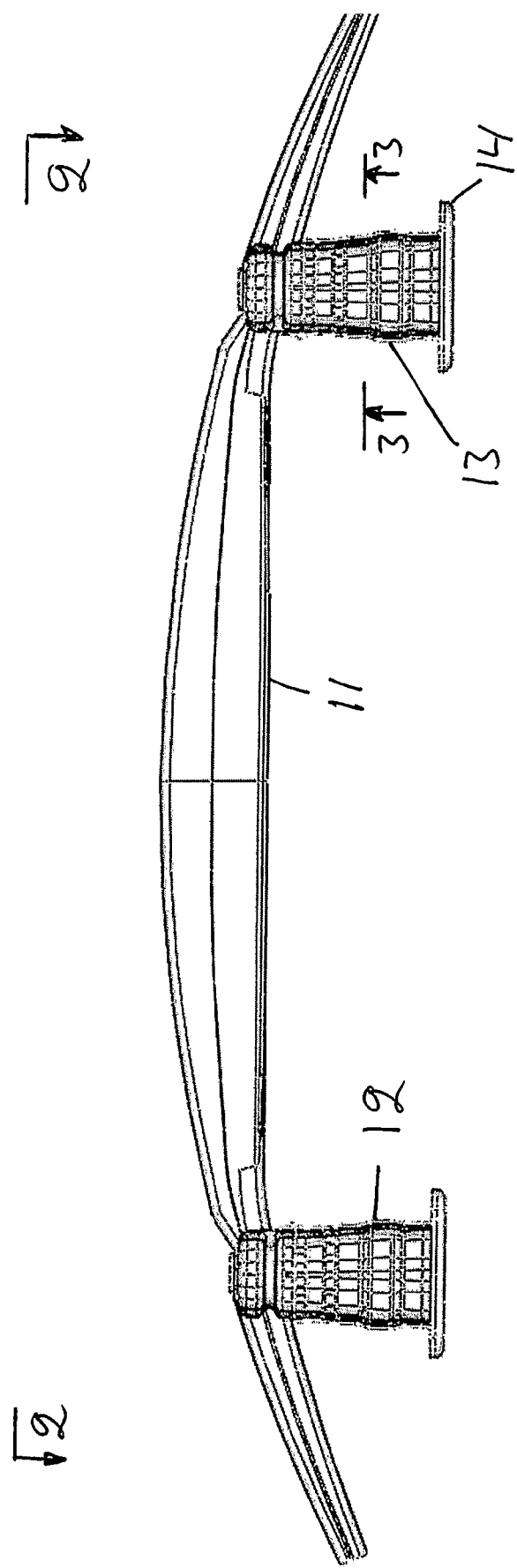

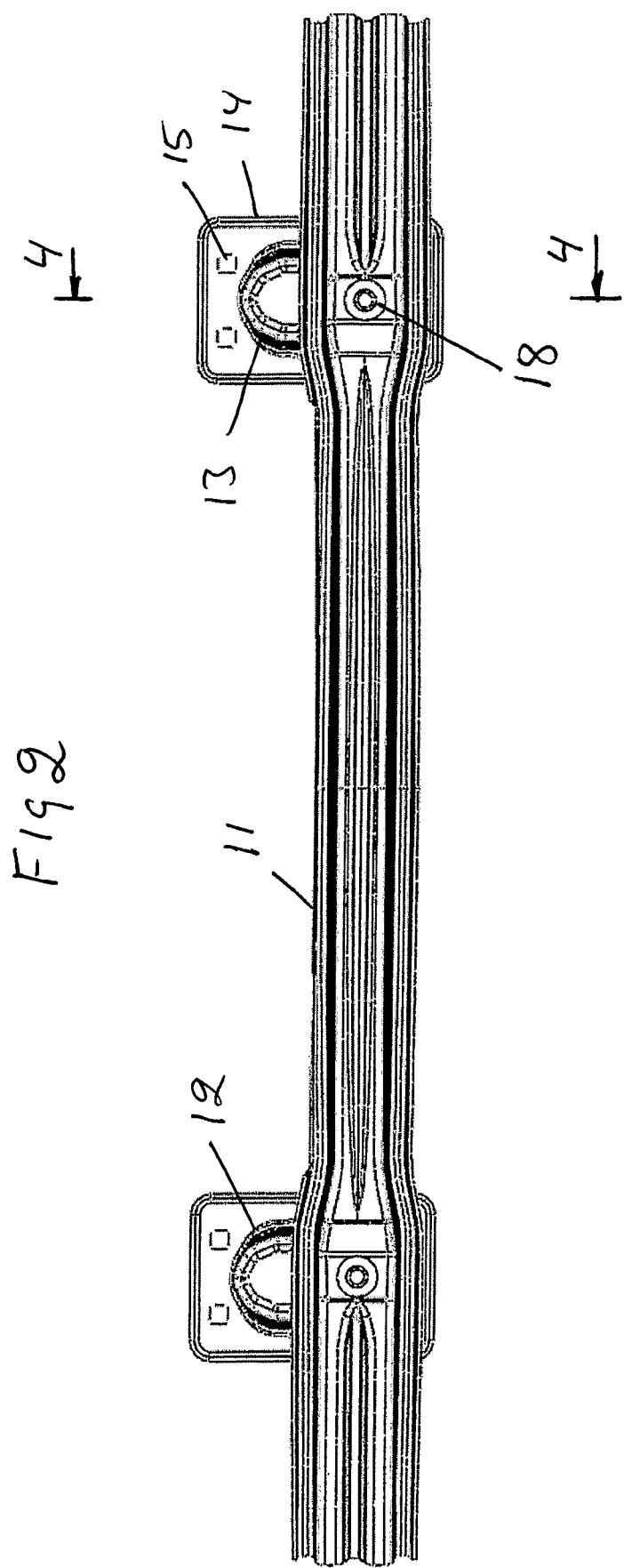

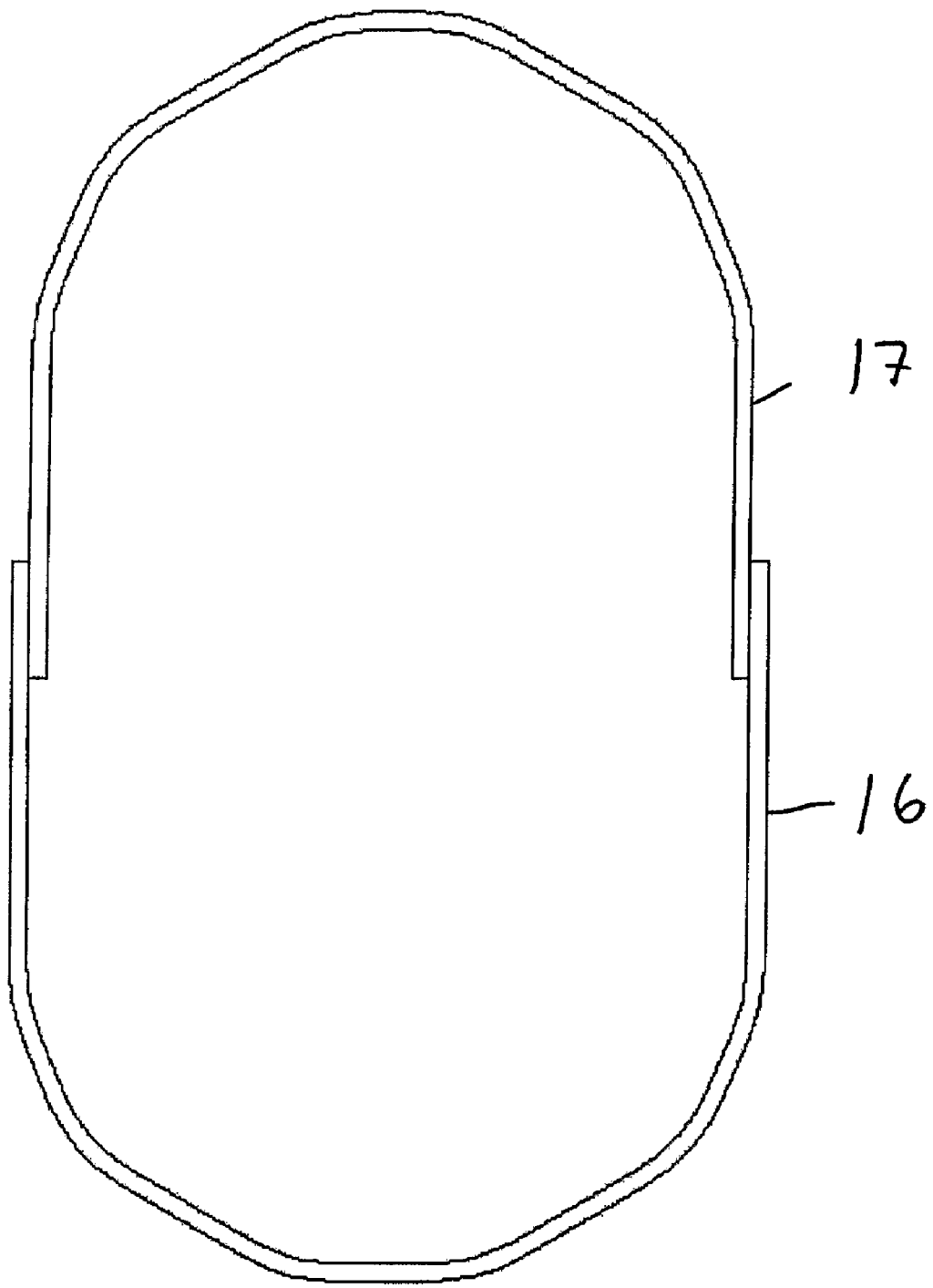

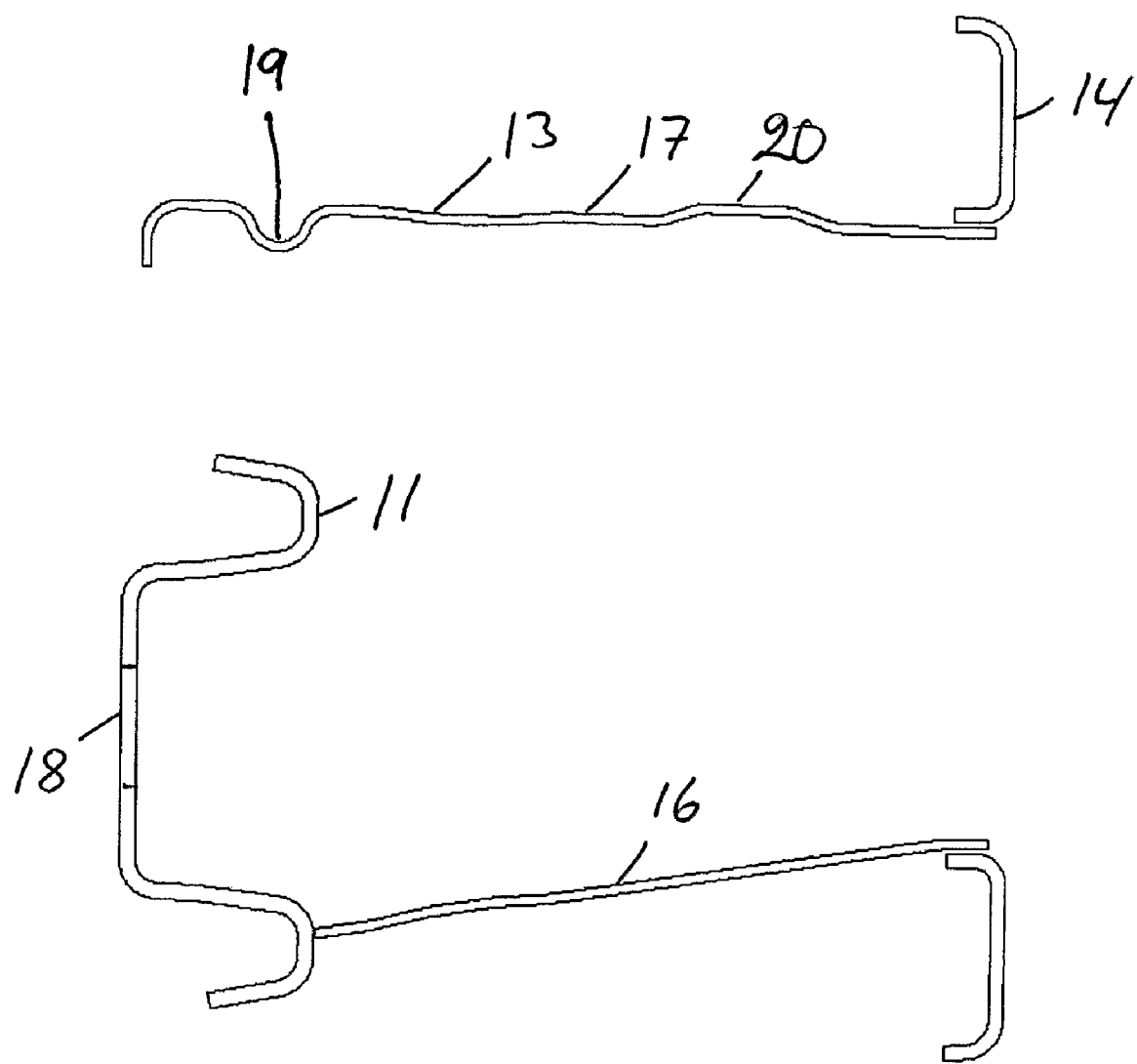

BUMPER BEAM ARRANGEMENT

TECHNICHAL AREA

This invention relates to a bumper arrangement for a vehicle comprising a bumper beam fastened in two crash boxes adapted to be fastened to the vehicle, wherein the bumper beam is vertically off-set fastened in the crash boxes, which have greater vertical extension than the bumper beam.

BACKGROUND OF THE INVENTION

The crash boxes are usually fastened to the side rails of the vehicle platform in order to directly transmit crash forces to the side rails. The bumper beam is usually in the same vertical position as the side rails so that the crash forces are transmitted symmetrically to the side rails. For some vehicles, for example a SUV, the bumper beam and the side rails will be vertically off-set. U.S. Pat. No. 5,803,514 illustrates a bumper beam and side rails that are vertically off set.

OBJECT OF INVENTION

It is an object of the invention to reduce the asymmetrical load on the crash boxes so as to improve the plastic deformation and the energy absorption when the height of the bumper beam is not at the same height as the vehicle platform. To this end, the portions of the crash boxes that are not covered by the bumper beam extend horizontally to a position within ten mm from the front end of the bumper beam. Triggers may be used to further control the deformation of the crash boxes.

BRIEF DESCRIPTION OF THE DRAWINGS

FIG. 1 shows, as an example of the invention, a bumper beam arrangement seen from above.

FIG. 2 shows the same arrangement seen as indicated by the arrows 2.

FIG. 3 is a section taken along line 3-3 in FIG. 1.

FIG. 4 is a section taken along line 4-4 in FIG. 2.

DESCRIPTION OF THE ILLUSTRATED AND PREFERRED EXAMPLE OF THE INVENTION

The FIGS. 1 and 2 show a bumper beam 11 fastened in two crash boxes 12,13. The crash boxes and the fastening of the bumper beam in them are similar and only the crash box 13 will be described. The crash box 13 has a plate or flange 14, preferably welded to the box, and the plate or flange has a number of screw holes 15 by which it can be fastened to a supporting part of the vehicle, that is, to the vehicle platform. It can for example be fastened by screws and nuts to a corresponding plate on the front end of a side rail of the vehicle. FIG. 3 is a transverse section of the crash box 13 that consists of a lower part 16 and an upper part 17, which are welded together to form a closed profile. From FIG. 2 can be seen that the bumper beam is fastened vertically off-set to the crash boxes, which are vertically higher than the bumper beam. From FIG. 1 can be seen that the crash box extends with its upper part 17 above the bumper beam substantially to the front end of the bumper beam as can also be seen from FIG. 4, which is a longitudinal section through the crash box.

The bumper beam has preferably a hat profile as shown in FIG. 4, but it may have another profile. It can be produced with the press hardening method, that is, hot stamped from a flat blank and directly hardened in the forming tools, which are cooled. With this process, yield strength of over 1000 MPa and even over 1500 MPa can be reached. Alternatively, the bumper beam can be formed cold from a high strength cold forming steel sheet. The two halves 16,17 of the crash box can preferably be produced similarly and then welded together.

The abutting end of the lower part 16 of the crash box and the abutting end of the lowest portion of the upper part 17 have a form adapted to the bumper beam and are welded to the bumper beam. The bumper beam has a hole 18, in which a support for a tow hook can be fastened. The upper part 17 of the crash box may have a trigger 19 at the inner end of its extended portion, which triggers and controls the initial deformation. Other triggers such as trigger 20 may also be used to control the further deformation of the crash box.

The position of the crash boxes 12,13 on the vehicle is determined by the design of the vehicle, and the bumper beam 11 must also be adapted to the design of the vehicle, but also to legislation and standard test procedures. The crash boxes are dimensioned not to begin to deform until the bumper beam has been deformed. They are shown as having a higher cross section height than the bumper beam has at its fastening portions. The portions of the crash boxes that are not covered by the bumper beam extend, as shown, to the front end of the bumper beam profile and these portions will take up crash forces when the bumper beam begins to deform or has been deformed. As a result, the tendency of the crash boxes to bend and to rotate the system downwards will be counteracted. In this way, the deformation properties will be good even though the bumper beam is vertically off-set the crash boxes. Preferably, the crash boxes extend substantially to the front end of the bumper beam profile as shown, but the desired function will be there also if they end within 10 mm behind the front end of the bumper beam or possibly even if they pass the bumper beam up to 10 mm.

The invention claimed is:

1. A bumper arrangement for a vehicle, said arrangement comprising a bumper beam fastened in two crash boxes adapted to be fastened to the vehicle, the bumper beam being fastened in the crash boxes, which have such that the bumper beam is vertically off-set from said crash boxes, said crash boxes having greater vertical extension than the bumper beam such that a portion of each of said crash boxes is not covered by said bumper beam, wherein the portions of the crash boxes that are not covered by the bumper beam extend towards the front end of the bumper beam to a position within ten mm from the front end of the bumper beam.

2. The bumper beam arrangement according to claim 1, wherein a deformation trigger is defined proximate to the inner end of the crash box portion that extends towards the front end of the bumper beam.

3. The bumper beam arrangement according to claim 1, wherein the portions of the crash boxes not covered by the bumper beam extend towards the front of the bumper beam in a substantially horizontal direction.

* * * * *

UNITED STATES PATENT AND TRADEMARK OFFICE
CERTIFICATE OF CORRECTION

PATENT NO.       : 7,413,226 B2                                               Page 1 of 1
APPLICATION NO.  : 10/591022
DATED            : August 19, 2008
INVENTOR(S)      : Per Muskos It is certified that error appears in the above-identified patent and that said Letters Patent is hereby corrected as shown below:

Column 2, Line 44 (Claim 1, Line 4):
Delete: ", which have".

Signed and Sealed this

Seventh Day of October, 2008

JON W. DUDAS
*Director of the United States Patent and Trademark Office*